May 8, 1951          L. L. LAYNE          2,552,287
WHEEL MASK
Filed May 13, 1948
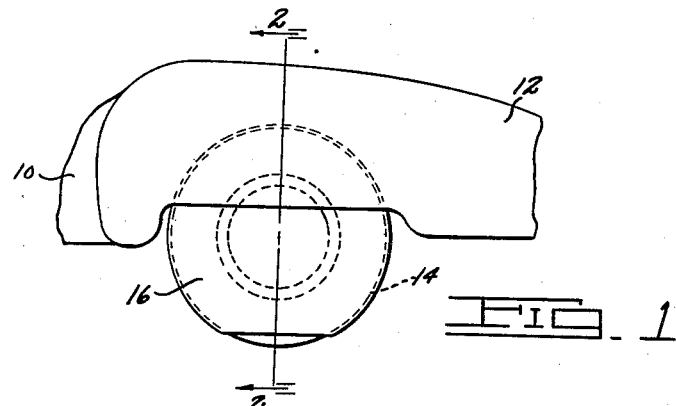
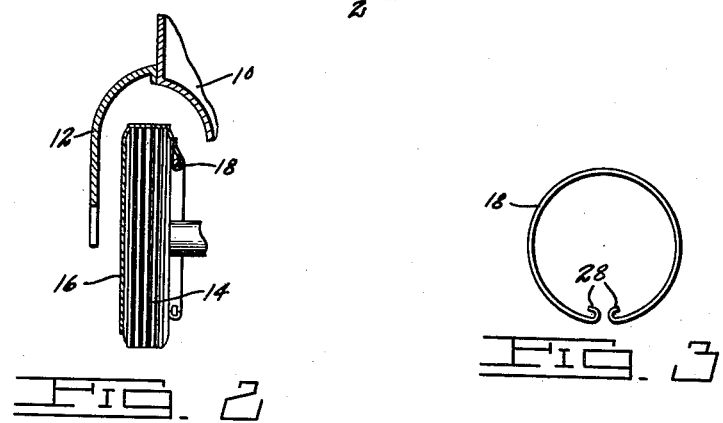
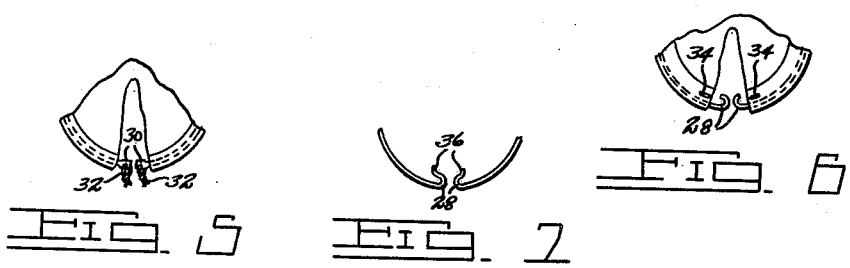
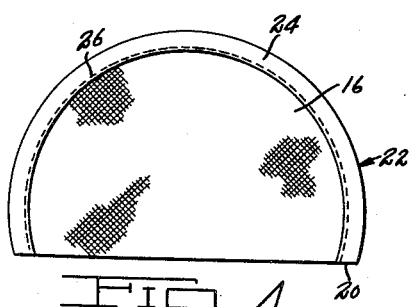
Inventor
LEROY L. LAYNE
By his Attorney Patented May 8, 1951

2,552,287

UNITED STATES PATENT OFFICE 2,552,287

WHEEL MASK

Leroy L. Layne, Detroit, Mich.

Application May 13, 1948, Serial No. 26,899

3 Claims. (Cl. 91—65)

This invention relates to a masking device and more particularly to a masking device for vehicle wheels and tires while the vehicle body and fenders are being painted without removal of the wheel or tire from the vehicle.

It is common practice to repair and paint vehicle fenders without removing them from the body and without removing the wheel or tire from the vehicle. In painting, particularly in paint spraying, it is difficult to prevent the paint from spotting the wheel or tire. It is therefore necessary to cover the wheels to prevent staining the latter.

Heretofore covers have been provided which were difficult to apply, particularly where the present fender design overlaps the upper portion of the wheel, making it difficult to apply the cover over the tire because of the narrow space between the side of the fender and the tire.

It is therefore an object of the present invention to provide a mask which protects the tire and wheel from paint applied to the fender and one in which the operator may readily apply the same to the tire without difficulty, the device being self adjusting to conform to the contour of the tire and to fit variable diameters of tires without manual adjustment or fitting.

Another object of the invention is to provide a mask which resiliently grips the outer periphery of the tire throughout a major portion of its periphery to maintain the mask in operative applied position.

Another object of the invention is to provide a mask which may be formed of a single sheet of fabric material reinforced at one edge by an expansible resilient member.

A further object of the invention is to provide a mask which may be folded to a relatively thin dimension for insertion between the fender skirt and the tire, after which it may be laterally expanded into covering position over the tire and securely held in applied position by the inherent tension in the resilient reinforcing means.

Other objects and advantages of the invention will more fully appear from the following description taken in connection with the accompanying drawings in which:

Fig. 1 is a side elevational view of an embodiment of the present invention as applied to a wheel and tire of an automobile showing the fender thereof in overlapping relation to the mask and wheel;

Fig. 2 is a vertical sectional view taken on line 2—2 of Fig. 1;

Fig. 3 is a side elevational view of a reinforcing ring for the mask;

Fig. 4 is a side elevational view of the fabric material forming the mask before the reinforcing ring has been applied;

Fig. 5 is a fragmentary view illustrating a means for securing the fabric material to the free ends of the reinforcing member;

Fig. 6 is a view showing a modified form of securing means for the ends of the reinforcing member; and Fig. 7 is a view showing a further modification of the ends of the reinforcing member.

Referring to the drawings, I have shown an automobile body 10 having a fender 12 the skirt of which is in overlapping relation to the side of a tire 14.

The mask is shown in Fig. 2 as applied in operative position and comprises essentially two portions, a fabric body portion 16, shown in Fig. 4 and a reinforcing ring 18 shown in Fig. 3. The fabric body portion 16 may be formed from canvas, leather, plastic or other flexible material having a straight lower edge portion 20 and a circular outer edge portion 22, the edge 22 being provided with a hem 24 formed by stitching 26.

The fabric is formed from a material having a diameter larger than the diameter of a standard wheel so that when the hemmed edge is placed over the tire the edge will lie adjacent to the rear side face of the tire, thus permitting the body of the fabric to cover the front side wall of the tire and the outer periphery of the tire as well as cover the outer rear face of the tire. By this design the body portion is adapted to fit over tires of variable diameter.

As a means of reinforcing the fabric body portion and for retaining the mask in position on the tire, I have provided a split ring 18, Fig. 3, adapted to be received in the hem 24. This ring is of less diameter than the diameter of the hem and when received in the hem the material is gathered so that it lies in plaits, or folds at its outer edge. The ends of the split ring 18 terminate at the lower edges of the hem 24.

The split ring 18 is preferably made of spring steel in the form of a wire bent circular with the free ends normally in engagement or in overlapping relation.

The ring 18 is threaded through the hem 24 with the looped ends 28 riveted or otherwise secured to the ends of the hem 24. As shown in Fig. 5 the ends of the wire may be flattened and provided with apertures 30 which receive holding devices such as rings 32. If desired the ends of the hem may be closed as by a staple or rivet 34 to prevent withdrawal of the ring ends through the hem, or the looped ends 28 may be reversely bent as at 36, Fig. 7, to prevent withdrawal.

It will be understood that when the ring 18, of a given diameter, is inserted in the hem of larger diameter, the ring will draw the hem edge inwardly by the tension of the spring steel material so that a pocket is formed in the body portion of the fabric to fit over the outer periphery of the tire.

When the device is not in use it is flat and may be readily inserted between the fender and tire. During the movement the operator grips the free ends of the ring and spreads the ring so that it will slide over the outer periphery of the tire. The ring and hem portion of the mask is then drawn downwardly and rearwardly so that the ring lies behind the tire. The tension then draws the edges of the fabric body inwardly when the operator releases the ring ends. This causes the ring to assume a diameter smaller than the diameter of the tire, gathering the material around the outer surface of the tire. The outer surface of the fabric is drawn smoothly and tightly over the outer surface of the wheel and tire.

The spring tension in the split ring tends to assume its normal circumferential position, drawing the edges radially inwardly so that the entire outer surface of the mask is smooth and tight. Thus, all loose edges and flaps are eliminated which heretofore have been displaced by the force of the gun pressure as in paint spraying.

An added advantage to be obtained in a mask having a tightly held front face is that the mask can be used for covering a freshly painted wheel without waiting for the wheel to dry before the body is painted. Heretofore when covers have been applied to a wheel the bottom portion of the mask is usually loose and folded so that the folds are easily moved into contacting relation with the freshly painted wheel.

If desired the fabric material may be treated with a waterproof coating to render the same impervious to moisture during the cleaning operation prior to painting.

It will be understood that various changes including the size, shape and arrangement of parts may be made without departing from the spirit of my invention and it is not my intention to limit its scope other than by the terms of the appended claims.

I claim:

1. A masking device for protecting an automobile wheel and tire during body painting which comprises, a sheet of fabric material having an arcuate peripherial portion and a straight edge portion, said straight edge portion having a greater length than the diameter of a tire which is to be covered, a hem in the arcuate peripherial portion, and a resilient wire in said hem having its opposite ends terminating at the ends of said hem, said wire being in the form of a circumferential loop having a normal diameter less than the normal diameter forming the arcuate portion of said fabric material the ends of said wire unconnected in order that they may be spread apart a distance greater than the diameter of the tire.

2. A masking device for protecting an automobile wheel and tire during body painting which comprises, a sheet of fabric material having an arcuate peripherial portion and a straight edge portion, said straight edge portion having a greater length than the diameter of the tire which is to be covered, a hem in the arcuate peripherial portion, a resilient wire normally in the form of a circumferential loop in said hem having its opposite ends terminating at the ends of said hem, said wire loop having a normal diameter less than the normal diameter forming the arcuate portion of said fabric material, the ends of said wire unconnected in order that they may be spread apart a distance greater than the diameter of the tire, and means for securing the ends of said wire to the ends of said hem.

3. A masking device for protecting an automobile wheel and tire during body painting which comprises, a flat sheet of flexible material having an arcuate peripherial portion of a circumferential dimension greater than a semicircle and a chordal edge portion, said chordal edge portion greater in length than the diameter of a tire to be covered, a hem in said arcuate peripherial portion, said hem being open at its ends in substantially a line with the chordal edge portion, and a split ring of spring steel normally in the form of a closed circular member in said hem, the ends of said split ring unconnected in order that upon distortion of said ring they may be a greater distance apart than the diameter of the tire, the normal diameter of said split ring being substantially equal to a diameter of the arcuate peripherial portion when the ends of said hem are brought together in forming a complete circle of the chordal portion.

LEROY L. LAYNE.

REFERENCES CITED

The following references are of record in the file of this patent:

UNITED STATES PATENTS

| Number | Name | Date |
| --- | --- | --- |
| 1,696,009 | McCormick | Dec. 18, 1928 |
| 1,755,133 | Rowe | Apr. 15, 1930 |
| 1,967,522 | Wengard | July 24, 1934 |
| 1,997,738 | Maxedon et al. | Apr. 16, 1935 |
| 2,212,166 | Nelson | Aug. 20, 1940 |
| 2,231,333 | Gunn | Feb. 11, 1941 |